United States Patent Office 3,421,601
Patented Jan. 14, 1969

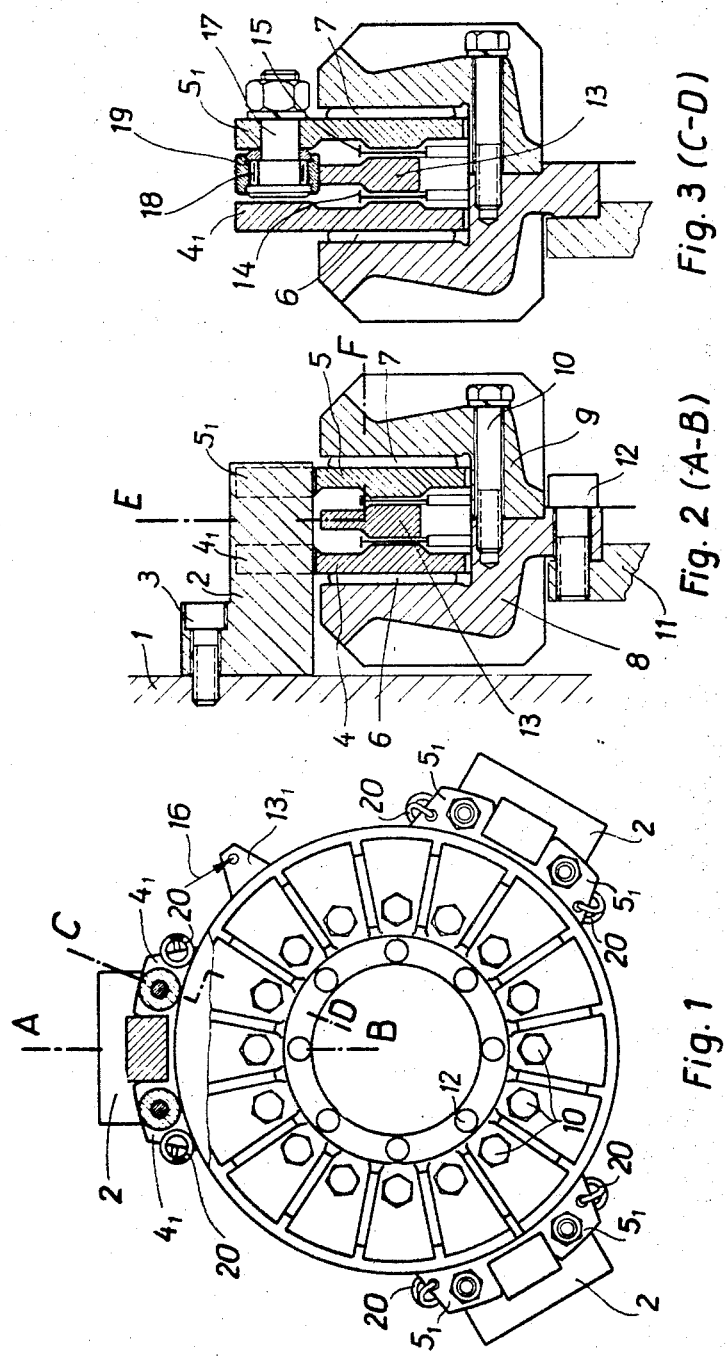

3,421,601
ACTUATOR MOUNTING MEANS FOR
SPREADING DISC BRAKE
Hermann Klaue, Ave. des Planches 3,
Montreux, Switzerland
Filed Dec. 1, 1967, Ser. No. 687,304
U.S. Cl. 188—72                4 Claims
Int. Cl. F16d 55/00

ABSTRACT OF THE DISCLOSURE

A disc brake of the type having an annular outwardly opening U-shaped housing and having an annular drive ring and the frictional disc elements located between the legs of the U. The drive ring is supported by rolling elements in contact with the outer periphery of the drive ring and rotatable about axis pins connected to outwardly extending projections of said disc elements.

Background—field of the invention

This invention relates to disc brakes, and in particular it relates to an improved arrangement for mounting the drive ring of a disc brake.

Background—description of the prior art

Heretofore, disc brakes have been known which have employed two circular disc elements arranged within an outwardly opening U-shaped annular rotating drum in such a manner as to be freely displaceable in the axial direction but fixed against rotation with the drum. Such disc brake assemblies generally include a circular drive ring mounted between the disc elements for limited rotational movement by an actuating means. The facing surfaces of the drive ring and the adjacent circular disc elements comprise opposing radially extending grooves with rolling members located in the grooves and extending from the bottom of a groove in the disc element to the bottom of the opposing groove in the facing surface of the drive ring. As the drive ring is rotated a limited amount relative to the non-rotatable disc elements, the rolling members rise out of the grooves to the raised portion of the opposed faces of the drive ring and the disc elements thereby urging the disc elements axially outwardly against the legs of the U-shaped drum to limit rotational movement of the latter.

In a disc brake of this type it is necessary to mount the drive ring so that it maintains its radial position relative to the axis while it undergoes limited rotational movement thereabout. The present solution for mounting the drive ring includes placing a series of rollers between the drive ring and the stationary structure which carries the brake assembly. This solution has proved satisfactory for the type of disc brake having an internally open brake housing where the brake carrier penetrates into the brake housing. In this environment there is no great danger of jamming because of increases in temperature since with the internally opening brake housing there is a sufficient flow of coolant through the brake assembly.

However, in the type of brake assembly to which the present invention pertains, namely, the type wherein the housing opens outwardly, it has been found most unsatisfactory to mount the drive ring on a brake carrier member. To provide sufficient freedom of movement, it is necessary that a certain amount of play be permitted between the mounting rollers and the drive ring. However, this same amount of play will render the disc brake assembly quite inefficient during certain times. Namely, when the brake elements are cold, then the thermal contraction of the drive ring will be much greater than that of the brake carrier so that the elements will rattle and the mechanical efficiency of the entire brake will deteriorate. On the other hand, if the amount of play during normal operation is made very small in order to prevent the disadvantages during cool operation, then the strong possibility exists that the drive ring would jam and thereby block operation of the brake when it became heated.

Summary of the invention

Thus, the purpose of this invention is to provide a new and improved arrangement for mounting a circular drive ring in an externally opened disc brake housing assembly.

According to the present invention the drive ring is supported by a plurality (for example at least three) rolling elements located in contact with the outer periphery of the drive ring, each roller being mounted on a pin parallel to the brake axis, the pin being connected to an outwardly extending projection of at least one of the disc elements of the brake. The advantage of this arrangement is that the disc elements, unlike the brake carrier members, will expand and contract by about the same amount as the drive ring. This result is obtained because there is good heat conduction between the disc element and the drive ring, for example, through the numerous rollers provided between the facing radial surfaces of the drive ring and the disc elements. Consequently, when the brake elements become very hot the drive ring will expand. However, the disc elements, and thus the rolling elements which support the outer periphery of the drive ring, will also expand so that rotational movement of the drive ring will not be prohibited. Conversely, when the drive ring becomes cold, the drive ring will also cool down at approximately the same rate so that rattling and inefficient operation does not result at cooler operating temperatures.

The present arrangement provides other advantages. The overall space taken up by the present arrangement is no more than that required by previous arrangements since the drive ring mounting elements are mounted within the framework of the existing brake. Also, since the various elements of the brake are mounted to each other rather than to the stationary brake carrier elements, it is quite easy to assemble the brake of the present invention.

Thus, it is an object of this invention to provide an improved disc brake assembly.

It is another object of this invention to provide a new and improved arrangement for mounting a drive ring in an externally opening disc brake assembly.

It is still another object of this invention to provide an arrangement for mounting a drive ring in an outwardly opening disc brake assembly wherein the drive ring operates efficiently at both high and low operating temperatures.

It is still another object of this invention to provide an arrangement in an externally opening disc brake assembly wherein the drive ring is attached directly to outwardly extending projections of the disc elements.

Other objects and the attendant advantages of the present invention will become apparent from the detailed description to follow together with the accompanying drawings.

Brief description of the drawings

In the drawings:

FIGURE 1 is a side view of a brake assembly and includes a partial cross-sectional view of a brake carrier projection taken along line E–F of FIGURE 2.

FIGURE 2 is an enlarged cross-sectional view taken along line A–B of FIGURE 1.

FIGURE 3 is a cross-sectional view taken along line C–D of FIGURE 1.

Detailed description of the preferred embodiment

FIGURE 1 is a side elevational view of a brake assembly, the rotating parts of which are rotatable about the axis X which is perpendicular to the plane of the paper as viewed in FIGURE 1.

The brake assembly includes a plurality of brake carrier members 2 which are affixed to a non-rotating chassis 1 by suitable bolts 3.

The brake assembly includes a pair of brake disc elements 4 and 5 having outwardly extending projections $4_1$ and $5_1$, respectively, which engage the brake carrier member 2 to permit movement of the brake discs parallel to the axis X while preventing rotative movement of the brake discs 4 and 5 about the axis X.

The brake discs 4 and 5 are provided on their outer surfaces with frictional lining surfaces 6 and 7, respectively.

The brake assembly further includes a rotatable drum comprising two half portions 8 and 9 connected together by a suitable bolt 10, the drum half 8 being connected by a suitable bolt 12 to a radial drive flange 11 which is rigidly connected to the rotating element to be braked. As is apparent from FIGURES 2 and 3, the rotating drum comprising parts 8 and 9 has a U-shaped cross-section wherein the inside surfaces of the legs of the U are engaged by frictional surfaces 6 and 7, when desired, to effect braking of the rotating element to which radial drive flange 11 is connected.

Between the two brake discs 4 and 5 there is provided an annular drive ring 13. Opposing faces of the drive ring and the adjacent disc elements include opposing grooves in which are mounted radially extending rolling elements. This type of coupling means is well known per se and forms no part of the present invention per se. These grooves have inclined surfaces so that as the drive ring undergoes limited rotative movement the rolling elements rise from the deepest parts of the grooves to the raised parts of the grooves thereby causing the disc elements to move axially away from the drive ring so that the frictional surfaces 6 and 7 frictionally engage the inner surfaces of the rotating drum. Such an arrangement is shown, for example, in my copending patent application No. 559,441, filed June 22, 1966. For clarity, the rolling elements are omitted from the present discussion. In FIGURES 2 and 3, there are shown cages 14 and 15 which provide uniform and constant spacing between the rolling elements.

To operate the brake a suitable power means, for example either hydraulic or mechanical means, is applied to a projecting portion $13_1$ of the drive ring 13, for example, in the direction indicated by the arrow 16.

An important feature of the present invention concerns the arrangement for mouting the drive ring 13. Referring in particular to FIGURES 1 and 3 there is shown a pin 17 passing through an outwardly projecting portion $5_1$ of the brake disc 5. Mounted on the pin 17, through the intermediary of suitable needle bearings 18, are rolling elements 19 which engage the outer periphery of the drive ring 13. In this manner, the plurality of rollers 19 hold the drive ring in place. Moreover, the drive ring will be held in place whether hot or cold, since the rollers 19, being mounted on adjacent disc elements, will tend to move outwardly and inwardly at approximately the same rate as the drive ring expands and contracts, respectively.

Suitable spring elements 20 are provided for urging the two outwardly projecting portions $4_1$ and $5_1$ together thereby causing the brake to disengage when the drive ring 13 is turned to the inoperative position.

Another feature of the present invention is the simplicity required to assemble and disassemble the brake. It is a simple matter to pull the entire brake assembly axially to disengage it from the brake carrier members 2.

I claim:
1. A disc brake for limiting relative rotational movement between a first member and a second member, the first member being rotatable about a first axis relative to the second member, comprising; a drum surrounding the said first axis and non-rotatably connected to the first member, said drum having a generally U-shaped cross-section taken in a plane including the said first axis, the legs of the U extending from a base outwardly away from the said first member, at least one disc element mounted in the opening of the U and non-rotatably connected to the second member, a circular drive ring located in the opening of the U on the side of the disc element away from one leg of the U and mounted for limited rotational movement about the said first axis for urging the disc element in a direction parallel to said first axis towards the said one leg of the U, thereby employing friction between the disc element and the said one leg of the U to limit relative rotational movement between the said first and second members, and support means for mounting the drive ring and centering the same about the first axis, said support means comprising at least three pins connected to said disc element, a rolling element mounted on each pin for rotational movement about an axis substantially parallel to the said first axis, each rolling element having its outer surface in contact with the outer periphery of the drive ring so that said drive ring is supported by engagement with said rolling elements, whereby when the disc brake is heated or cooled, the drive ring and the disc element, being at approximately the same temperature, will expand and contract together such that the rolling element will remain in supporting engagement with the outer periphery of said drive ring during thermal expansion and contraction of the drive ring and disc element.

2. A drive ring as claimed in claim 1 wherein the disc brake includes two disc elements mounted in the opening of the U, each said disc element being adjacent one of the said legs of the U with the drive ring located therebetween, and including an inclined track and cooperating rolling members located between the drive ring and each disc element, whereby limited rotational movement of the drive ring about the axis causes the disc elements to move parallel to the axis to frictionally engage the legs of the U.

3. A disc brake as claimed in claim 1 wherein the disc element includes projecting portions extending radially outwardly beyond the outer periphery of the drive ring, said three pins being connected to said projections and extending in a direction across the outer periphery of the drive ring in a direction substantially parallel to the axis, and each said rolling element mounted on each pin for free rotational movement thereabout.

4. A drive ring as claimed in claim 3 wherein the disc brake includes two disc elements mounted in the opening of the U, each said disc element being adjacent one of the said legs of the U with the drive ring located therebetween, and including an inclined track and cooperating rolling members located between the drive ring and each disc element, whereby limited rotational movement of the drive ring about the axis causes the disc elements to move parallel to the axis to frictionally engage the legs of the U.

References Cited

UNITED STATES PATENTS

| 2,998,103 | 8/1961 | Klaue | 188—72 |
| 3,240,292 | 3/1966 | Klaue | 188—72 |

FOREIGN PATENTS

| 1,118,625 | 11/1961 | Germany. |

GEORGE E. A. HALVOSA, *Primary Examiner.*

U.S. Cl. X.R.

192—70